Dec. 9, 1969     E. EINSTEIN ET AL     3,483,280
METHOD OF BURNING MAGNESIUM AND CALCIUM CARBONATE MATERIALS
Filed April 19, 1968
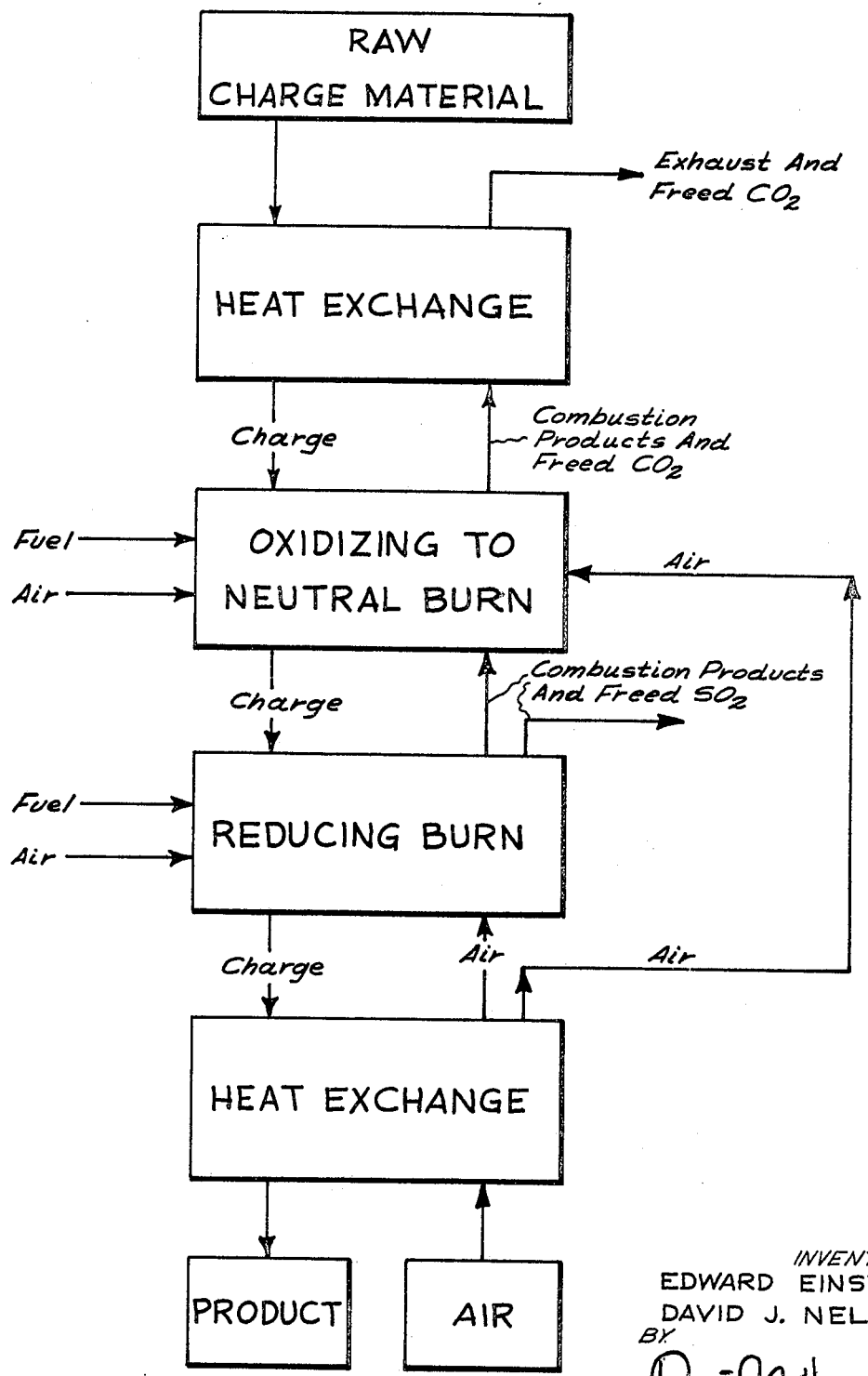
INVENTORS.
EDWARD EINSTEIN &
DAVID J. NELL
BY
ATTORNEY

United States Patent Office 3,483,280
Patented Dec. 9, 1969

3,483,280
METHOD OF BURNING MAGNESIUM AND CALCIUM CARBONATE MATERIALS
Edward Einstein, Bethel Park, and David J. Nell, West Mifflin, Pa., assignors to Dresser Industries, Inc., Dallas, Tex., a corporation of Delaware
Filed Apr. 19, 1968, Ser. No. 722,710
Int. Cl. C04b 1/02, 7/44
U.S. Cl. 263—53       3 Claims

ABSTRACT OF THE DISCLOSURE

A method of burning materials containing calcium carbonate and one or more sulfates in recuperative-type furnaces whereby substantially all the sulfate is removed from the materials.

BACKGROUND

When one or more sulfates, for example, calcium sulftaes or magnesium sulfate is or are present in a mixture of magnesium carbonate or calcium carbonate materials, it is often desirable to substantially eliminate the sulfate when burning to remove the $CO_2$. For example, limestone burnt for use in preparing steelmaking slags, especially in the basic oxygen process, must contain less than about 0.04% $SO_3$. Sulfate in excess of this amount tends to reduce the activity of the burnt lime, thereby slowing the rate at which it enters the slag. In the manufacture of magnesia from sea water or brines, calcined dolomite is mixed with sea water to precipitate the magnesium values. If the sulfur content of the dolomite is excessive, the dolomite is very slow to enter the reaction and is referred to by those in the industry as killed.

For burning processes to be commercial, it is necessary that they be both continuous and recuperative. By recuperative is meant that the exhaust gases escaping from the kiln be used to preheat the incoming charge material and that the exiting charge material be used to preheat the incoming combustion air. Recuperative-type furnaces include shaft kilns, rotary kilns, and multiple hearth kilns, among others.

Sulfates can be removed from materials containing calcium carbonate and magnesium carbonate by expelling the sulfur in the form of gases. The addition of coke or other reducing agents to the mixture prior to burning facilitates expulsion of sulfur in the gaseous form. The addition of the reducing agent causes reduction of the sulfates which, through a series of reactions, is ultimately converted (in the case of calcium sulfate) into calcium oxide and sulfur dioxide. Typical chemical reactions are:

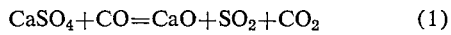

$$CaSO_4 + CO = CaO + SO_2 + CO_2 \quad (1)$$

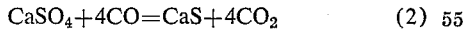

$$CaSO_4 + 4CO = CaS + 4CO_2 \quad (2)$$

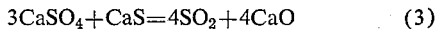

$$3CaSO_4 + CaS = 4SO_2 + 4CaO \quad (3)$$

The amount of the reducing agent used to reduce the sulfate must be carefully controlled since an excess will cause a further reduction, wherein part of the sulfate will be reduced to sulfide (reaction 2). If sulfate remains, the sulfide will react with it expelling $SO_2$ (reaction 3). If no sulfate remains, the sulfide can be decomposed only by excessive heat (2550° F.) creating a less active product and, therefore, will be retained in the final product.

As the reactions set forth above are reversible, removal of sulfate from calcium carbonate-containing materials cannot be performed in recuperative-type furnaces of the type described above. The sulfate is removed at temperatures above about 2000° F. when the atmospheres are slightly reducing. The released sulfate becomes part of the exhaust gases. As the exhaust gases move through the incoming charges to transfer their heat thereto, the sulfates are redeposited upon the incoming material. This is especially true if the exhaust gases passing through the incoming material are not maintained slightly reducing.

It is an object of this invention to provide a continuous method of burning materials containing calcium carbonate and one or more sulfates in recuperative-type furnaces, wherein the sulfate is substantially entirely removed. It is another object of this invention to provide a method of burning dolomitic materials containing up to 5% $SO_3$, wherein the product is suitable for use in the manufacture of magnesia from sea water or brines. It is yet another object of this invention to provide a method of burning limestone and similar materials containing up to 5% $SO_3$, whereby the product is suitable for the preparation of slags in basic oxygen steelmaking processes.

BRIEF DESCRIPTION OF THE INVENTION

According to this invention, a method of burning materials containing calcium carbonate and one or more sulfates, for example, limestone or lime sands or dolomite, are burnt in a continuous process in a recuperative-type furnace. In this process, the materials are heated in two stages. The charge materials are heated in an oxidizing or neutral atmosphere to about 1800° F. by the combustion of fuels and air. During this stage, substantially all the $CO_2$ is released from the carbonates. The combustion products and freed $CO_2$ produced in this first stage are used to preheat the materials prior to entering the first stage. In the second stage, the charge materials are heated in a reducing atmosphere by the combustion of fuels with insufficient air to a temperature of about 2000 to 2400° F. During this reducing stage, the remaining $CO_2$ is freed from the carbonates and the $SO_2$ is removed from the sulfates. A portion of the combustion products and freed $CO_2$ and $SO_2$ produced in the reducing stage are then passed through the charge materials being treated in the first or oxidizing stage. The remaining portion of the combustion products and freed $CO_2$ and $SO_2$, produced in the reducing stage, are exhausted. The ratio of the portion passed into the oxidizing stage and the portion exhausted is adjusted such that substantially all sulfur is removed from the material.

DETAILED DESCRIPTION

Further features and other objects and advantages of this invention will become clear to those skilled in the art by a careful study of the following detailed description. In this specification and appended claims, all percentages and ratios are by weight; chemical analyses were obtained by spectrographic analysis with control by wet chemical analysis, and are reported as oxides.

This sole drawing is a flow diagram of the process according to the teachings of this invention. In the diagram, the charge material moves from top to bottom as it would in a shaft kiln or a multiple hearth kiln. The charge first enters a heat exchanger and then passes into an oxidizing or neutral burn wherein most of the carbonate is removed. Thereafter, the charge passes into a reducing burn wherein the remaining $CO_2$ is removed and the $SO_2$ is removed. The charge finally passes into an optional heat exchanger and is recovered. Air for introduction into the reducing or the neutral to oxidizing burn may be preheated in the lower heat exchange step. The oxidizing burn is heated by combustion of fuels and air. The reducing burn is heated by combustion of fuels with insufficient air to completely oxidize all of the fuels. The combustion products and $CO_2$ formed in the neutral or oxidizing burning stage are passed into the upper heat exchange, and thereafter exhausted. The combustion products and freed $SO_2$ created in the reducing burn are handled in a very special manner. A portion of these products are passed into the oxidizing or neutral burn to recover unburned fuel values and heat. Another portion is exhausted. The ratio of the portion passed into the oxidizing to neutral burn and that portion exhausted is adjusted so that substantially all the sulfur is removed from the product. If all of the products of the reducing burn were passed into the oxidizing to neutral burn, it would not be possible to remove $SO_2$ from the product. The $SO_2$ freed in the reducing burn would combine with the material in the oxidizing to neutral or in the upper heat exchanger, and thereby be returned to the reducing burn. Eventually, the material entering the reducing burn would contain more sulfur than could be removed in the reducing burn and it would pass on with the product. The optimum ratio of the portion of the products of the reducing burn to be passed into the oxidizing burn and those to be exhausted is determinable once a furnace has been installed and a process has been started up. It depends to a large extent on the temperatures used in the oxidizing and neutral burns and the effectiveness of the reducing burn for removal of sulfates. The ratio of the portion exhausted, to the portion passed into the oxidizing or neutral burn should preferably be between 80:20 and 20:80. The larger the portion passed into the oxidizing or neutral burn, the greater the heat saving. On the other hand, depending on the amount of $SO_3$ in the charge material, the larger the portion exhausted the less $SO_3$ in the product. It is within the concepts of this invention to exhaust all the combustion products of the reducing burn into the atmosphere.

EXAMPLE I

The process, according to the teachings of this invention, was practiced on lime sands by the use of two furnaces. One furnace was a four-hearth Herreshoff-type furnace in which the charge material is fed on the uppermost hearth. The charge material moves across each hearth and then drops to the next lower hearth. The hearths are numbered from top to bottom 1, 2, 3, and 4. The charge material is removed from the lowest or number 4 hearth and passed into a separate furnace. This furnace was a single hearth rotary hearth furnace. Burners were placed in the number 3 and 4 hearth of the Herreshoff furnace and in the single hearth furnace.

The following table gives the temperature and selected chemical analyses of the charge material and the material on each hearth and the temperature of each hearth in the process according to this invention.

Table I establishes that lime sands comprising as much as 0.6% $SO_3$ (on a calcined basis) can be burnt, according to this invention, with removal of all but 0.03 to 0.04% $SO_3$. Table I establishes by the change in ignition loss further that the $CO_2$ is removed from the lime sands primarily on the number 3 hearth of the multiple hearth furnace. The $SO_3$ was removed on the reducing hearth in the rotary hearth furnace. As a portion of the products of combustion from the reducing hearth were passed into the Herreshoff furnace, the $SO_3$ content on the number 2, 3, and 4 hearths was increased. This is because the $SO_3$ rapidly reattaches itself to the CaO. However, by exhausting approximately one-half of the combustion products of the rotary hearth furnace, it is possible to provide a satisfactory product. This product will be suitable for use in the production of steel by the basic oxygen process.

EXAMPLE II

The apparatus described above was used for treating a high sulfur dolomite material. The significant process data are given in Table II.

TABLE II

| | Feed material | Multiple hearth furnace | | | Rotary hearth furnace reducing (1.5 to 1.7% combustibles) | Product |
| | | 1 | 2 | 3 | 4 | |
| | | Oxidizing burn | | | | |
| --- | --- | --- | --- | --- | --- | --- |
| Temperature, °F | 890–940 | 1,320–1,380 | 1,650–1,720 | 1,790–1,850 | 1,985–1,990 | |
| $SO_3$ (calcined basis), percent | 1.09 | | 0.97–1.28 | 0.91–1.06 | | 0.01–0.02 |
| Loss on ignition, percent | 27.5 | | 0.03–0.20 | 0.07–1.08 | | 0.08–0.32 |

Table II establishes that dolomitic materials can be successfully processed according to the teachings of this invention. In both Examples I and II, $CO_3$ was reduced to less than 0.05%.

Commercial processes reportedly require sufficient fuel to provide $4 \times 10^6$ and $8 \times 10^6$ B.t.u.'s/ton of limestone calcined. If a one-stage process is used in which the total furnace is maintained reducing, and all gases are discharged at 2200 F., the fuel requirement would be that which would provide between $40 \times 10^6$ and $50 \times 10^6$ B.t.u.'s/ton. Applicants' process, however, which has a reducing step requires between $6 \times 10^6$ and $10 \times 10^6$ B.t.u.'s/ton.

Having thus described the invention in detail, and with sufficient particularity as to enable those skilled in the art to practice it, what is desired to have protected by Letters Patent is set forth in the following claims:

We claim:
1. A method of burning materials containing calcium carbonate and one or more sulfates comprising the steps of:
   (1) preheating the materials,
   (2) heating the preheated materials in an oxidizing to neutral atmosphere to about 1800° F. by the introduction of combustible fuels and air to free $CO_2$ from the carbonates, withdrawing the combustion products and freed $CO_2$ and passing them through material to be preheated in step 1,
   (3) heating the material of step 2 in a reducing atmosphere by the introduction of combustible fuels and insufficient air to from 2000 to 2400° F. to free remaining $CO_2$ from the carbonates and $SO_2$ from the sulfates, withdrawing a portion of the combustion products and freed $CO_2$ and $SO_2$ and passing them directly through the materials being treated in step

TABLE I

| | Charge material | Multiple hearth furnace | | | Rotary hearth furnace reducing (1.0 to 2.2%[1] combustibles) | Product |
| | | 1 | 2 | 3 | 4 | |
| | | Oxidizing or neutral | | | | |
| --- | --- | --- | --- | --- | --- | --- |
| Temperature, °F | | 730–1,020 | 1,180–1,435 | 1,430–1,720 | 1,790–1,860 | 2,040–2,220 | |
| $SO_3$ (calcined basis), percent | 0.6 | | 0.6–0.85 | 0.61–1.20 | 0.77–2.52 | | 0.03–0.04 |
| Loss on ignition, percent | 44 | | 40 | 3.2 | 0.16 | | Trace |

[1] Presence of combustibles measured by Bailey Meter evidences reducing atmosphere.

2 and exhausting the remaining portion, the ratio of the portion passed into step 1 to the portion exhausted adjusted such that substantially all sulfur is removed from the material, and (4) recovering the burnt material substantially free of sulfur.

2. Method according to claim 1 in which the ratio of (a) combustion products and freed $CO_2$ and $SO_2$ produced in step 3 and passed onto step 2 to (b) the portion of the combustion products and freed $CO_2$ and $SO_2$ exhausted to the atmosphere is between 20:80 and 80:20.

3. The method according to claim 1 in which all the combustion products of step 3 are exhausted into the atmosphere.

References Cited

UNITED STATES PATENTS

| | | | |
|---|---|---|---|
| 2,945,688 | 7/1960 | Pajenkamp et al. | 263—53 |
| 3,044,756 | 7/1962 | Grebe et al. | 263—53 |

JOHN J. CAMBY, Primary Examiner